US009952357B2

United States Patent
Jung et al.

(10) Patent No.: US 9,952,357 B2
(45) Date of Patent: Apr. 24, 2018

(54) HIGH RESOLUTION OPTICAL SYSTEM

(71) Applicant: Samsung Electro-Mechanics Co., Ltd., Suwon-si (KR)

(72) Inventors: Phil Ho Jung, Suwon-si (KR); Il Yong Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 13/954,938

(22) Filed: Jul. 30, 2013

(65) Prior Publication Data

US 2014/0118817 A1    May 1, 2014

(30) Foreign Application Priority Data

Oct. 25, 2012    (KR) .......................... 10-2012-0118915

(51) Int. Cl.
| | | |
|---|---|---|
| *G02B 3/04* | (2006.01) | |
| *G02B 13/00* | (2006.01) | |
| *G02B 3/00* | (2006.01) | |
| *G02B 13/14* | (2006.01) | |
| *G02B 9/62* | (2006.01) | |

(52) U.S. Cl.
CPC ............... *G02B 3/04* (2013.01); *G02B 3/00* (2013.01); *G02B 13/0045* (2013.01); *G02B 13/14* (2013.01); *G02B 9/62* (2013.01)

(58) Field of Classification Search
CPC ...... G02B 13/0045; G02B 13/22; G02B 9/62; G02B 3/04; G02B 3/00; G02B 13/14
USPC ....... 359/713, 355, 356, 357, 708, 754–757, 359/796, 797; 250/226
See application file for complete search history.

(56) References Cited

U.S. PATENT DOCUMENTS

| | | | |
|---|---|---|---|
| 6,043,939 A | 3/2000 | Toyama | |
| 8,472,128 B2 | 6/2013 | Huang | |
| 2010/0277576 A1* | 11/2010 | Fattal .................... | H04N 5/222 348/54 |

(Continued)

FOREIGN PATENT DOCUMENTS

| | | |
|---|---|---|
| CN | 202 217 102 U | 5/2012 |
| CN | 202217102 U | 5/2012 |

(Continued)

OTHER PUBLICATIONS

Office Action dated Nov. 28, 2013 for corresponding Korean Patent Application No. 10-2012-0118915 and its English summary provided by the clients.

(Continued)

*Primary Examiner* — Bumsuk Won
*Assistant Examiner* — Wen Huang
(74) *Attorney, Agent, or Firm* — NSIP Law

(57) ABSTRACT

The present invention relates to a high resolution optical system.

The optical system of the present invention includes, sequentially from an object side, a first lens having a positive refractive power and an object-side surface convex toward the object side; a second lens having a negative refractive power and an upwardly concave upper surface; a third lens having a positive refractive power; a fourth lens having a negative refractive power; a fifth lens having a positive refractive power and an upwardly convex upper surface; and a six lens having a negative refractive power and an upwardly concave upper surface.

12 Claims, 6 Drawing Sheets

(56) References Cited

U.S. PATENT DOCUMENTS

| | | |
|---|---|---|
| 2011/0134543 A1* | 6/2011 | Jung .................. G02B 13/004 359/715 |
| 2012/0188654 A1 | 7/2012 | Huang |
| 2012/0194726 A1 | 8/2012 | Huang et al. |
| 2013/0003193 A1 | 1/2013 | Huang |
| 2013/0033762 A1 | 2/2013 | Tsai et al. |
| 2013/0070346 A1 | 3/2013 | Hsu et al. |
| 2013/0120858 A1* | 5/2013 | Sano ............................ 359/713 |
| 2013/0235473 A1 | 9/2013 | Chen et al. |
| 2013/0342918 A1 | 12/2013 | Kubota et al. |

FOREIGN PATENT DOCUMENTS

| | | |
|---|---|---|
| CN | 102621667 | 8/2012 |
| JP | 11-249017 | 9/1999 |
| JP | 2002-62475 | 2/2002 |
| JP | 2012-155223 | 8/2012 |
| JP | 2014-26254 | 2/2014 |
| KR | 10-2010-0040357 A | 4/2010 |
| KR | 10-2011-0024872 A | 3/2011 |
| TW | 201226964 | 7/2012 |
| TW | 201232092 | 8/2012 |
| TW | 201307885 | 2/2013 |
| TW | 201312154 | 3/2013 |
| WO | 2012/008357 A1 | 1/2012 |
| WO | WO 2012008357 A1 * | 1/2012 |
| WO | 2013/114812 | 8/2013 |

OTHER PUBLICATIONS

Extended European Search Report dated Nov. 28, 2013 for corresponding European Patent Application No. 13275155.

Office Action dated May 28, 2014 for corresponding Korean Patent Application No. 10-2012-0118915 and its English summary provided by the Applicant's foreign counsel.

Office Action dated Aug. 26, 2014 for Japanese Patent Application No. 2013-147734 and its English summary provided by Applicant's foreign counsel.

Office Action dated Dec. 18, 2014 for Taiwanese Patent Application No. 102125546 and its English summary provided by Applicant's foreign counsel.

Office Action dated Dec. 16, 2014 for Japanese Patent Application No. 2013-147734 and its English summary provided by Applicant's foreign counsel.

Office Action dated Dec. 10, 2015 in the corresponding Chinese Patent Application No. 201310303653.2, 7pages in English, 5 pages Chinese.

* cited by examiner

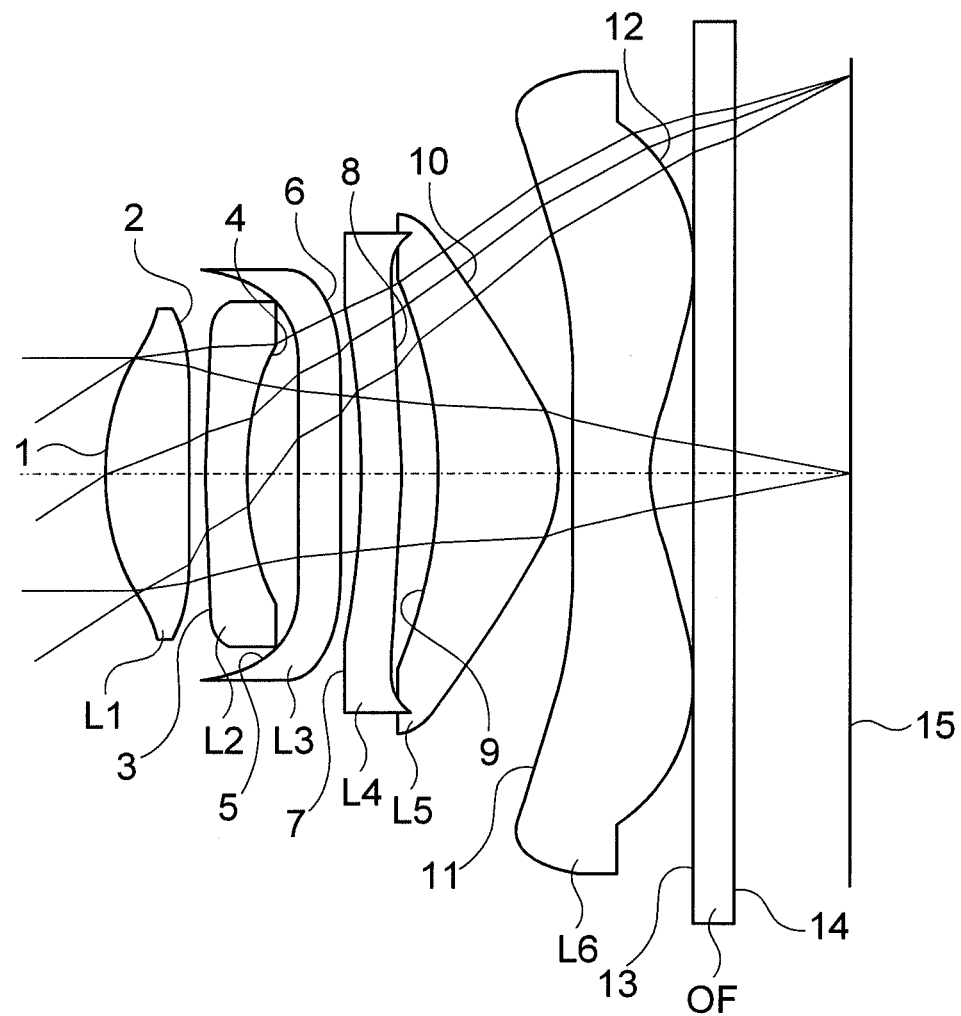
[FIG. 1]

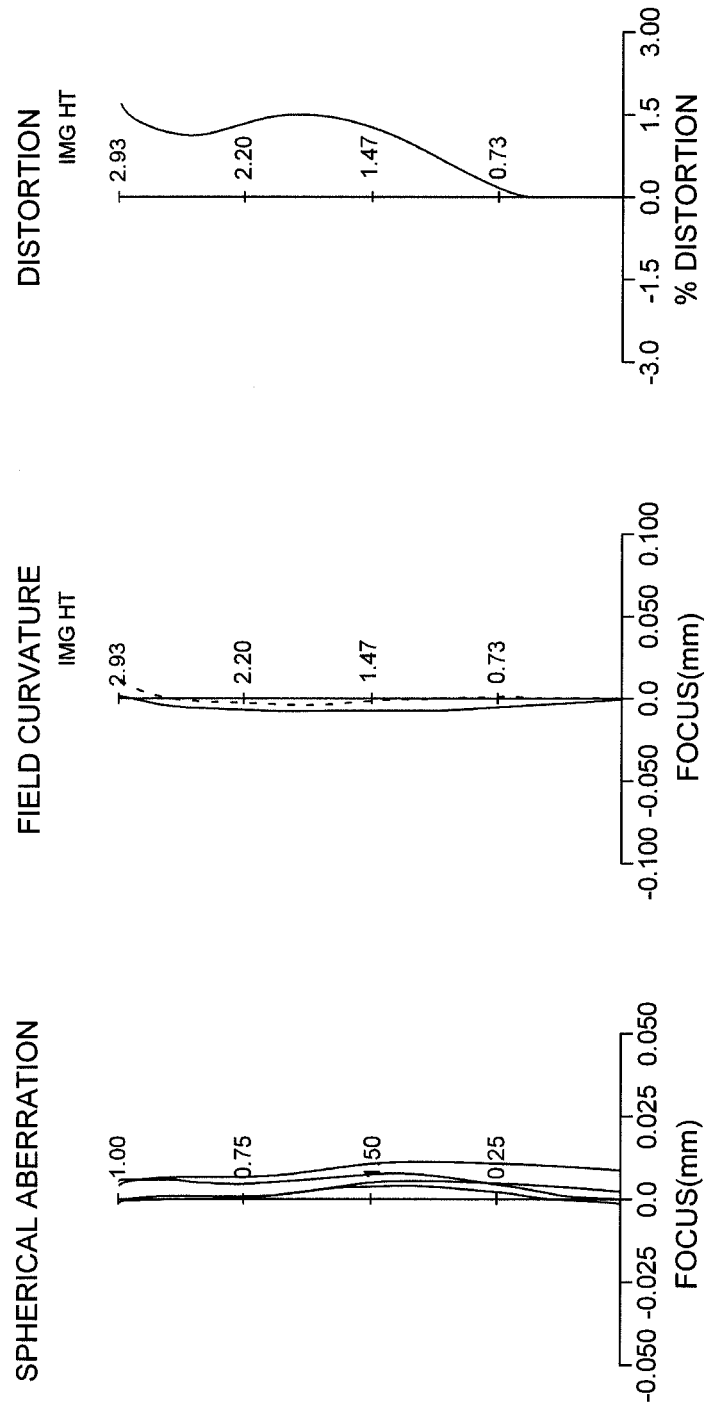
[FIG. 2]

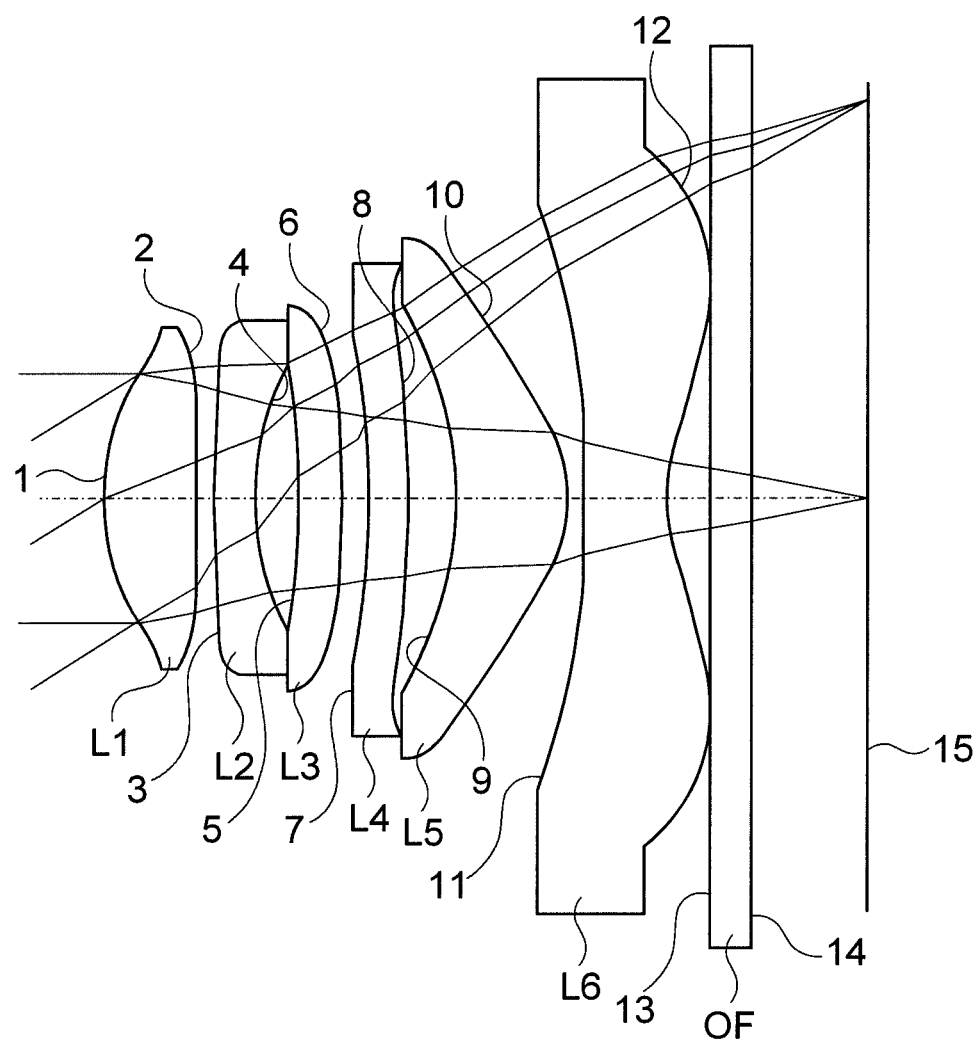
[FIG. 3]

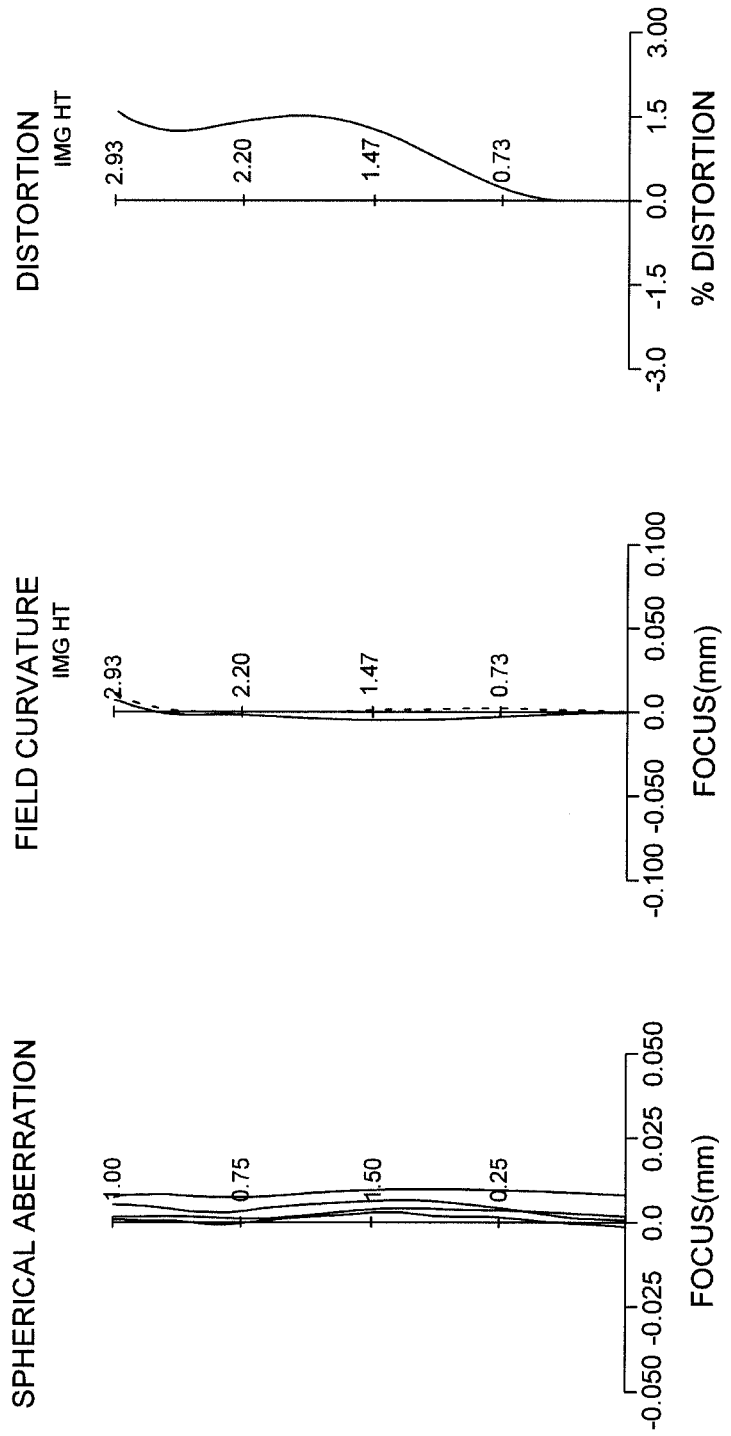
[FIG. 4]

[FIG. 5]
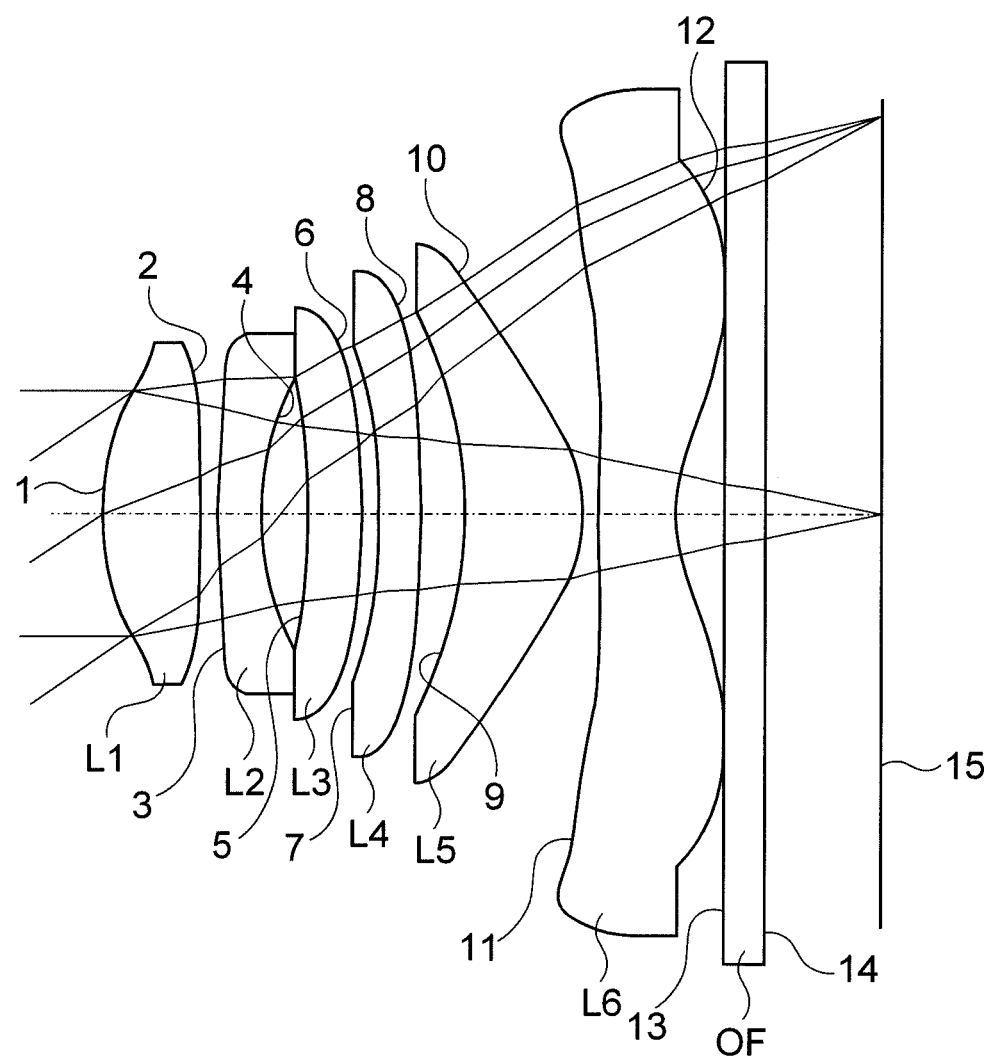

[FIG. 6]
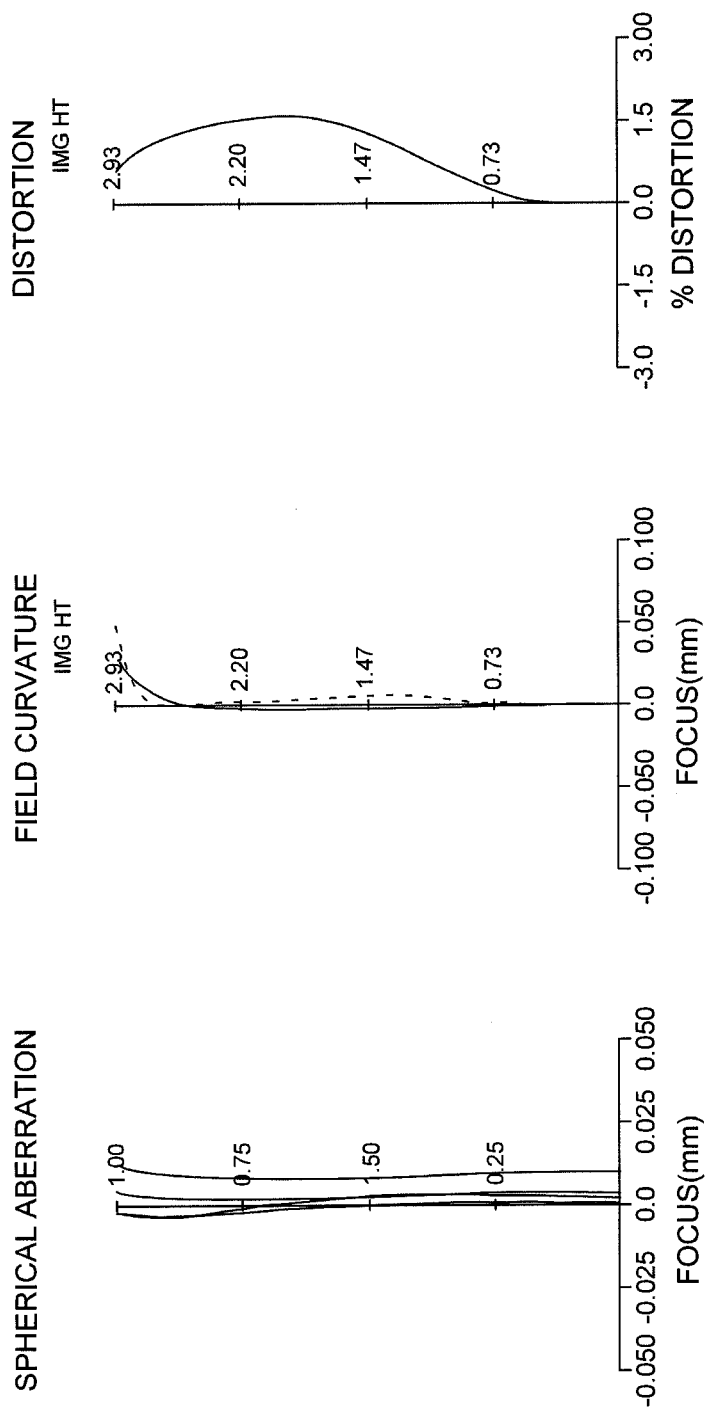

HIGH RESOLUTION OPTICAL SYSTEM

CROSS-REFERENCE TO RELATED APPLICATIONS

Claim and incorporate by reference domestic priority application and foreign priority application as follows:

Cross Reference to Related Application

This application claims the benefit under 35 U.S.C. Section 119 of Korean Patent Application Serial No. 10-2012-0118915, entitled filed Oct. 25, 2012, which is hereby incorporated by reference in its entirety into this application."

BACKGROUND OF THE INVENTION

1. Field of the Invention

The present invention relates to an optical system, and more particularly, to an optical system that can implement high resolution using six lenses.

2. Description of the Related Art

In general, mobile communication means such as mobile communication terminals, PDA, and smartphones become to have various additional functions in addition to basic communication functions along with their increased use and diversification of services provided through communication technology.

In particular, camera modules mounted to the mobile communication means are in increasing demand as various convergence devices for high definition video shooting, automatic focus adjustment, and QR code recognition in addition to simple photo shooting using a single focus.

Further, as the size of the camera modules is gradually reduced, higher resolution is required, and as the number of pixels of image sensors is gradually increased, high resolution optical systems are required.

And, in recent times, manufacturing costs of the camera modules are gradually reduced along with price cuts of the mobile communication devices.

In order to reduce the unit price of the camera module, first, it is most preferred to reduce manufacturing costs of lens groups constituting an optical system embedded in the camera module. However, in order to satisfy the above-mentioned conditions on improvement of resolution, the optical system should be constituted by applying a glass lens having high optical performance, but it is impossible to reduce the manufacturing costs of the camera module by using several sheets of expensive glass lenses.

Further, when employing a plurality of glass lenses to overcome the resolution problem, it is impossible to reduce a weight of the optical system.

RELATED ART DOCUMENT

Patent Document

Patent Document 1: Korean Patent Laid-open Publication No. 2011-24872

SUMMARY OF THE INVENTION

Therefore, the present invention has been invented in order to overcome the above-described disadvantages and problems raised in a conventional mobile camera optical system and it is, therefore, an object of the present invention to provide an optical system that can implement high resolution and reduce manufacturing costs by configuring an optical system using six aspherical plastic lenses.

Further, it is another object of the present invention to provide a high resolution optical system that can implement high resolution and configure a compact optical system by properly placing optical power for six plastic lenses.

In accordance with one aspect of the present invention to achieve the object, there is provided an optical system including, sequentially from an object side: a first lens having a positive refractive power and an object-side surface convex toward the object side; a second lens having a negative refractive power and an upwardly concave upper surface; a third lens having a positive refractive power; a fourth lens having a negative refractive power; a fifth lens having a positive refractive power and an upwardly convex upper surface; and a six lens having a negative refractive power and an upwardly concave upper surface.

At this time, an aperture stop may be disposed in front of the first lens or between the first lens and the second lens to block unnecessary light of the light incident or passing through the optical system.

Further, the optical system satisfies the following Conditional Expression with respect to conditions of optical power.

$$|f4/f|>2.5 \qquad \text{[Conditional Expression]}$$

Here, f4 represents a focal length of the fourth lens, and f represents a focal length of the entire optical system.

Further, the optical system satisfies the following Conditional Expression with respect to conditions of correction of chromatic aberration.

$$V1-V4<40 \qquad \text{[Conditional Expression]}$$

Here, V1 represents an Abbe number of the first lens, and V4 represents an Abbe number of the fourth lens.

Further, the optical system satisfies the following Conditional Expression with respect to conditions of the shape of the fourth lens.

$$0.5<OAL/f<2.0 \qquad \text{[Conditional Expression]}$$

Here, OAL represents a distance from the vertex of an optical axis to an upper surface of the first lens, and f represents a focal length of the entire optical system.

And, the optical system satisfies the following Conditional Expression with respect to conditions of chromatic aberration.

$$V2<30 \qquad \text{[Conditional Expression]}$$

Here, V2 represents an Abbe number of the second lens.

Further, the first to sixth lenses may be formed of plastic lenses, and at least one of both surfaces of the first to sixth lenses may be formed as an aspherical surface. Preferably, the both surfaces of the first to sixth lenses may be formed as aspherical surfaces.

Further, an optical filter, which consists of a cover glass coated with an infrared cut filter for blocking excessive infrared rays included in light introduced from the outside, may be further included between the six lens and an image surface.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a configuration diagram showing lens arrangement of an optical system in accordance with a first embodiment of the present invention;

FIG. 2 is an aberration diagram of the optical system shown in Table 1 and FIG. 1;

FIG. 3 is a configuration diagram showing lens arrangement of an optical system in accordance with a second embodiment of the present invention;

FIG. 4 is an aberration diagram of the optical system shown in Table 3 and FIG. 3;

FIG. 5 is a configuration diagram showing lens arrangement of an optical system in accordance with a third embodiment of the present invention; and FIG. 6 is an aberration diagram of the optical system shown in Table 5 and FIG. 5.

DETAILED DESCRIPTION OF THE PREFERABLE EMBODIMENTS

A matter regarding to an operation effect including a technical configuration for an object of an optical system in accordance with the present invention to achieve the object will be clearly appreciated through the following detailed description with reference to the accompanying drawings illustrating preferable embodiments of the present invention.

However, in the following lens configuration diagram of each embodiment, the thickness, size, and shape of lenses may be somewhat exaggerated for detailed description of the present invention. Particularly, the shape of a spherical surface or an aspherical surface shown in the lens configuration diagram is shown as an example and not limited thereto.

First, FIG. 1 is a lens configuration diagram showing an embodiment of an optical system in accordance with the present invention. As shown, a high resolution optical system of the present embodiment may include a first lens L1 having a positive refractive power, a second lens L2 having a negative refractive power, a third lens L3 having a positive refractive power, a fourth lens L4 having a negative refractive power, a fifth lens L5 having a positive refractive power, and a sixth lens L6 having a negative refractive power.

At this time, as for the shape of the lenses constituting the optical system, the first lens L1 may have a shape in which an object-side surface is convex toward an object, the second lens L2 may have a shape in which an upper surface is concave upward, the fifth lens L5 may have a shape in which an upper surface is convex upward, and the sixth lens L6 may have a shape in which an upper surface is concave upward.

Further, an optical filter OF, which consists of an infrared filter for blocking excessive infrared rays included in light passing through the optical system or a cover glass coated with the infrared filter, may be provided between the sixth lens L6 and an image surface 15.

Further, in the optical system of the present invention, all of the first to sixth lenses L1 to L6 may be formed of plastic lenses, and one or both surfaces of the first to sixth lenses L1 to L6 may be formed as aspherical surfaces.

The reason for forming at least one of the both surfaces of the first lens L1 and the second lens L2 of the lenses, which constitute the optical system in accordance with the present invention, as an aspherical surface is to improve a degree of freedom in design for facilitating correction of aberrations including chromatic aberration and mitigating manufacturing tolerances. Further, the reason for forming all of the first to sixth lens L1 to L6 with plastic lenses is to configure an optical system that can be used in mobile devices by achieving a light weight even though the optical system consists of a plurality of lenses due to characteristics of the optical system having easiness in manufacture of aspherical surfaces compared to glass lenses and mainly mounted to the mobile devices.

Meanwhile, as mentioned above, the optical system of the present invention can perform aberration correction and achieve miniaturization while using a plurality of lenses by the following Conditional Expressions 1 and 4. Operational effects of Conditional Expressions will be described below.

$$|f4/f|<2.5 \quad \text{[Conditional Expression 1]}$$

Here, f4 represents a focal length of the fourth lens, and f represents a focal length of the entire optical system.

Conditional Expression 1 relates to conditions of optical power of the fourth lens and the entire optical system. It is possible to make the entire optical system compact by adjusting a refractive power of the fourth lens by Conditional Expression 1. At this time, when deviating from a lower limit of Conditional Expression 1, since it is difficult to secure performance of resolution of a peripheral portion of the lens due to an increase in negative power of the fourth lens, a length of the entire optical system may be increased to compensate for this.

$$V1-V4<40 \quad \text{[Conditional Expression 2]}$$

Here, V1 represents an Abbe number of the first lens, and V4 represents an Abbe number of the fourth lens.

Conditional Expression 2 relates to conditions of correction of chromatic aberration of the optical system. When deviating from a lower limit of Conditional Expression 2, it may be impossible to implement high resolution of the entire optical system due to a difficulty in correction of chromatic aberration.

$$0.5<OAL<f<2.0 \quad \text{[Conditional Expression 3]}$$

Here, OAL represents a distance from the vertex of an optical axis to an upper surface of the first lens, and f represents a focal length of the entire optical system.

Conditional Expression 3 relates to conditions of the shape of lenses of the optical system. When deviating from a lower limit of Conditional Expression 3, since it is not possible to secure a proper field of view of the optical system, the field of view is reduced. When exceeding an upper limit, since the entire length of the optical system is increased, it is not possible to configure a compact optical system.

$$V2<30 \quad \text{[Conditional Expression 4]}$$

Here, V2 represents an Abbe number of the second lens.

Conditional Expression 4 relates to conditions of chromatic aberration of the optical system. When deviating from a lower limit of Conditional Expression 4, it is impossible to implement high resolution of the entire optical system due to a difficulty in correction of chromatic aberration.

Hereinafter, a compact wide-angle optical system in accordance with the present invention will be described in detail with reference to specific numerical embodiments.

As described above, all of the following first to third embodiments may include a first lens L1 having a positive refractive power and an object-side surface convex toward an object side; a second lens L2 having a negative refractive power and an upwardly concave upper surface; a third lens L3 having a positive refractive power; a fourth lens L4 having a negative refractive power; a fifth lens L5 having a positive refractive power and an upwardly convex upper surface; and a sixth lens L6 having a negative refractive power and an upwardly concave upper surface, and an optical filter OF, which consists of an infrared filter or a cover glass coated with the infrared filter, may be provided between the sixth lens L6 and an image surface 15.

Further, an aperture stop (AS) may be installed in the first lens L1 or between the first lens L1 and the second lens L2 to block unnecessary light incident on the optical system.

Further, the first to sixth lenses L1 to L6 may be formed of plastic lenses, and one of both surfaces of the first to sixth lenses L1 to L6 may be formed as an aspherical surface.

Meanwhile, an aspherical surface used in each of the following embodiments is obtained from known Equation 1, and E and a number following the E used in a Conic constant K and aspherical coefficients A, B, C, D, E, and F represent a 10's power. For example, E+02 represents $10^2$, and E-02 represents $10^{-2}$.

$$Z = \frac{cY^2}{1+\sqrt{1-(1+K)c^2Y^2}} + AY^4 + BY^6 + CY^8 + DY^{10} + EY^{12} + FY^{14} + \ldots \quad \text{[Equation 1]}$$

Here, Z: distance from vertex of lens in the direction of optical axis
Y: distance in the direction perpendicular to optical axis
c: reciprocal of radius of curvature (r) at vertex of lens
K: Conic constant
A, B, C, D, E, F: aspherical coefficients First Embodiment The following Table 1 shows numerical examples according to the first embodiment of the present invention.

Further, FIG. 1 is a configuration diagram showing lens arrangement of an optical system in accordance with the first embodiment of the present invention, and FIG. 2 shows an aberration diagram of the optical system shown in Table 1 and FIG. 1.

In the first embodiment, an effective focal length (F) of the entire optical system is 4.3 mm, a distance (OAL) from the vertex of an optical axis to an upper surface of the first lens is 5.449 mm, and a field of view (FOV) is 67.7°.

Further, a focal length of the first lens L1 is 3.185 mm, a focal length of the second lens L2 is −5.089 mm, a focal length of the third lens is 19.79 mm, a focal length of the fourth lens L4 is −23.459 mm, a focal length of the fifth lens L5 is 2.067 mm, and a focal length of the sixth lens L6 is −2.054 mm.

At this time, all of the first to sixth lenses L1 to L6 may be formed of plastic lenses.

TABLE 1

| Surface No. | Radius of Curvature (R) | Thickness (mm) | Refractive Index (n) | Abbe Number (ν) | Remarks |
|---|---|---|---|---|---|
| *1 | 1.794 | 0.62 | 1.544 | 56.1 | First lens |
| *2 | −51.128 | 0.13 | | | |
| *3 | 4.935 | 0.30 | 1.632 | 23.4 | Second lens |
| *4 | 1.914 | 0.37 | | | |
| *5 | 16.281 | 0.30 | 1.544 | 56.1 | Third lens |
| *6 | −32.007 | 0.15 | | | |
| *7 | −8.518 | 0.30 | 1.632 | 23.4 | Fourth lens |
| *8 | −20.000 | 0.27 | | | |
| *9 | −3.451 | 0.87 | 1.544 | 56.1 | Fifth lens |
| *10 | −0.927 | 0.10 | | | |
| *11 | 14.414 | 0.56 | 1.544 | 56.1 | Sixth lens |
| *12 | 1.027 | 0.32 | | | |
| 13 | ∞ | 0.30 | 1.517 | 64.2 | Optical filter |
| 14 | ∞ | 0.85 | | | |

In Table 1, the * sign in front of the surface No. represents an aspherical surface. In the first embodiment, one or both surfaces of the first to sixth lenses L1 to L6 are aspherical surfaces.

Further, values of aspherical coefficients of the first embodiment by Equation 1 are as in the following Table 2.

TABLE 2

| Surface No. | K | A | B | C | D | E |
|---|---|---|---|---|---|---|
| 1 | 0 | 0.00080 | −0.00550 | 0.01344 | −0.01904 | 0 |
| 2 | 0 | −0.06313 | 0.13673 | 0.15630 | 0.04743 | 0 |
| 3 | 0 | −0.18849 | 0.33976 | −0.35757 | 0.05301 | −0.00906 |
| 4 | 0 | −0.17307 | 0.28346 | −0.24419 | 0.95736 | 0 |
| 5 | 0 | −0.09130 | 0.03735 | −0.00227 | −0.01159 | 0 |
| 6 | 0 | 0.03190 | 0.03715 | −0.02333 | 0.00066 | 0 |
| 7 | 0 | −0.01121 | 0.00585 | −0.00030 | −0.00260 | 0 |
| 8 | 0 | −0.02243 | 0.00251 | −0.00028 | 0.00110 | 0 |
| 9 | −14.81500 | −0.05738 | 0.04788 | −0.03246 | 0.01215 | −0.00181 |
| 10 | −3.85011 | −0.08732 | 0.06137 | −0.03202 | 0.01081 | −1.44E−03 |
| 11 | 0 | −0.03276 | −0.00422 | −0.00374 | −0.00065 | 3.65E−03 |
| 12 | −6.73354 | −0.04177 | 0.00844 | −0.00187 | 0.00022 | −1.13E−05 |

Second Embodiment

The following Table 3 shows numerical examples according to the second embodiment of the present invention.

Further, FIG. 3 is a configuration diagram showing lens arrangement of an optical system in accordance with the second embodiment of the present invention, and FIG. 4 shows an aberration diagram of the optical system shown in Table 3 and FIG. 3.

In the second embodiment, an effective focal length (F) of the entire optical system is 4.5 mm, a distance (OAL) from the vertex of an optical axis to an upper surface of the first lens is 5.592 mm, and a field of view (FOV) is 65.3°.

Further, a focal length of the first lens L1 is 3.144 mm, a focal length of the second lens L2 is −4.836 mm, a focal length of the third lens L3 is 20.064 mm, a focal length of the fourth lens L4 is −48.537 mm, a focal length of the fifth lens L5 is 2.328 mm, and a focal length of the sixth lens L6 is −2.157 mm.

At this time, all of the first to sixth lenses L1 to L6 may be formed of plastic lenses.

TABLE 3

| Surface No. | Radius of Curvature (R) | Thickness (mm) | Refractive Index (n) | Abbe Number | Remarks |
|---|---|---|---|---|---|
| *1 | 1.839 | 0.68 | 1.544 | 56.1 | First lens |
| *2 | −22.721 | 0.12 | | | |
| *3 | 5.344 | 0.30 | 1.632 | 23.4 | Second lens |
| *4 | 1.915 | 0.33 | | | |
| *5 | −24.900 | 0.31 | 1.544 | 56.1 | Third lens |
| *6 | −7.647 | 0.18 | | | |
| *7 | −12.088 | 0.30 | 1.632 | 23.4 | Fourth lens |
| *8 | −20.000 | 0.37 | | | |
| *9 | −3.264 | 0.81 | 1.544 | 56.1 | Fifth lens |
| *10 | −0.995 | 0.11 | | | |
| *11 | −304.909 | 0.62 | 1.544 | 56.1 | Sixth lens |
| *12 | 1.184 | 0.29 | | | |
| 13 | ∞ | 0.30 | 1.517 | 64.2 | Optical filter |
| 14 | ∞ | 0.85 | | | |

In Table 3, the * sign in front of the surface No. represents an aspherical surface. In the second embodiment, one or both of the first to sixth lenses L1 to L6 are aspherical surfaces.

Further, values of aspherical coefficients of the second embodiment by Equation 1 are as in the following Table 4.

TABLE 4

| Surface No. | K | A | B | C | D | E |
|---|---|---|---|---|---|---|
| 1 | 0 | 0.00141 | −0.00889 | 0.01567 | −0.01664 | 0 |
| 2 | 0 | −0.05635 | 0.13584 | 0.15710 | 0.04960 | 0 |
| 3 | 0 | −0.18277 | 0.34510 | −0.35977 | 0.14880 | −0.00883 |
| 4 | 0 | −0.17854 | 0.28954 | −0.24213 | 0.09009 | 0 |
| 5 | 0 | −0.09326 | 0.04705 | −0.00190 | −0.01416 | 0 |
| 6 | 0 | −0.03383 | 0.03559 | −0.02350 | 0.00068 | 0 |
| 7 | 0 | −0.01421 | 0.00209 | −0.00056 | −0.00134 | 0 |
| 8 | 0 | −0.02287 | 0.00331 | −0.00045 | 0.00087 | 0 |
| 9 | −12.78900 | −0.06441 | 0.04598 | −0.03273 | 0.01200 | −0.00192 |
| 10 | −3.78835 | −0.08652 | 0.06057 | −0.03270 | 0.01074 | −1.38E−03 |
| 11 | 0 | −0.03082 | −0.00353 | 0.00377 | −0.00065 | 3.54E−05 |
| 12 | −733606 | −0.04270 | 0.00911 | −0.00192 | 0.00022 | −1.03E−05 |

Third Embodiment

The following Table 5 shows numerical examples according to the third embodiment of the present invention.

Further, FIG. 5 is a configuration diagram showing lens arrangement of an optical system in accordance with the third embodiment of the present invention, and FIG. 6 shows an aberration diagram of the optical system shown in Table 5 and FIG. 5.

In the third embodiment, an effective focal length (F) of the entire optical system is 4.37 mm, a distance (OAL) from the vertex of an optical axis to an upper surface of the first lens is 5.684 mm, and a field of view (FOV) is 67.4°.

Further, a focal length of the first lens L1 is 3.089 mm, a focal length of the second lens L2 is −4.363 mm, a focal length of the third lens L3 is 9.937 mm, a focal length of the fourth lens L4 is −14.406 mm, a focal length of the fifth lens L5 is 2.136 mm, and a focal length of the sixth lens L6 is −2.141 mm.

At this time, all of the first to sixth lenses L1 to L6 may be formed of plastic lenses.

TABLE 5

| Surface No. | Radius of Curvature (R) | Thickness (mm) | Refractive Index (n) | Abbe Number (ν) | Remarks |
|---|---|---|---|---|---|
| *1 | 1.945 | 0.71 | 1.544 | 56.1 | First lens |
| *2 | −11.133 | 0.11 | | | |
| *3 | 5.393 | 0.31 | 1.632 | 23.4 | Second lens |
| *4 | 1.796 | 0.35 | | | |
| *5 | −192.752 | 0.39 | 1.544 | 56.1 | Third lens |
| *6 | −5.285 | 0.12 | | | |
| *7 | −5.196 | 0.32 | 1.544 | 56.1 | Fourth lens |
| *8 | −15.612 | 0.32 | | | |
| *9 | −2.895 | 0.87 | 1.544 | 56.1 | Fifth lens |
| *10 | −0.920 | 0.10 | | | |
| *11 | 8.644 | 0.57 | 1.544 | 56.1 | Sixth lens |
| *12 | 1.007 | 0.36 | | | |
| 13 | ∞ | 0.30 | 1.517 | 64.2 | Optical filter |
| 14 | ∞ | 0.85 | | | |

In Table 5, the * sign in front of the surface No. represents an aspherical surface. In the third embodiment, one or both surfaces of the first to sixth lenses L1 to L6 are aspherical surfaces.

Further, values of aspherical coefficients of the third embodiment by Equation 1 are as in the following Table 6.

TABLE 6

| Surface No. | K | A | B | C | D | E |
|---|---|---|---|---|---|---|
| 1 | 0 | 0.00051 | −0.01481 | 0.01850 | −0.01714 | 0 |
| 2 | 0 | −0.04903 | 0.13616 | 0.16040 | 0.05199 | 0 |
| 3 | 0 | −0.17566 | 0.35084 | −0.35797 | 0.14694 | −0.00923 |
| 4 | 0 | −0.19005 | 0.29351 | −0.24124 | 0.08676 | 0 |
| 5 | 0 | −0.09684 | 0.04540 | −0.00410 | −0.01300 | 0 |
| 6 | 0 | −0.03318 | 0.04118 | −0.02075 | 0.00143 | 0 |
| 7 | 0 | −0.01820 | 0.00061 | 0.00218 | −0.00123 | 0 |
| 8 | 0 | −0.02483 | 0.00321 | −0.00131 | 1.54E−05 | 0 |
| 9 | −7.32031 | −0.04726 | 0.05039 | −0.03290 | 0.01176 | −0.00212 |
| 10 | −3.64537 | −0.09621 | 0.06332 | −0.03262 | 0.010732 | −1.33E−03 |
| 11 | 0 | −0.04093 | −0.00257 | 0.00387 | −0.00065 | 3.33E−05 |
| 12 | −6.13717 | −0.04287 | 0.00920 | −0.00184 | 0.00022 | −1.14E−05 |

Meanwhile, values of Conditional Expressions for the first to third embodiments are as in the following Table 7.

TABLE 7

| Classification | Embodiment 1 | Embodiment 2 | Embodiment 3 |
|---|---|---|---|
| f4/f | −5.455581 | −10.786 | −3.296568 |
| v1-v4 | 32.7 | 32.7 | 0 |
| OAL/f | 1.2671427 | 1.2425765 | 1.3006439 |
| v2 | 23.4 | 23.4 | 23.4 |

As described above, the optical system in accordance with the present invention can achieve a light weight as well as reduce manufacturing costs by forming six lenses with plastic lenses.

Further, the present invention can implement high resolution by improving efficiency of correction of aberrations including chromatic aberration and minimizing chromatic aberrations.

Further, the present invention can improve a degree of freedom in design by forming both surfaces of six lenses, which constitute an optical system, as aspherical surfaces and manufacture a high resolution optical system by forming all of the first to sixth lenses with plastic lenses to reduce aberration values.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. A high resolution optical system comprising, sequentially from an object side:
   a first lens having positive refractive power and an object-side surface convex toward the object side;
   a second lens having negative refractive power and a concave image-side surface;
   a third lens having positive refractive power and a convex image-side surface in a paraxial region;
   a fourth lens having negative refractive power and a convex image-side surface in a paraxial region through which an optical axis passes;
   a fifth lens having positive refractive power; and
   a sixth lens having negative refractive power and a concave image-side surface, wherein the optical system satisfies the following Conditional Expression with respect to conditions of optical power:

$|f4/f| > 2.5$ [Conditional Expression]

where, f4 represents a focal length of the fourth lens, and f represents a focal length of the entire optical system.

2. The high resolution optical system according to claim 1, wherein an aperture stop is disposed in front of the first lens or between the first lens and the second lens.

3. The high resolution optical system according to claim 1, wherein the optical system satisfies the following Conditional Expression with respect to conditions of correction of chromatic aberration:

$V1 - V4 < 40$ [Conditional Expression]

where, V1 represents an Abbe number of the first lens, and V4 represents an Abbe number of the fourth lens.

4. The high resolution optical system according to claim 1, wherein the optical system satisfies the following Conditional Expression with respect to conditions of the shape of the fourth lens:

$0.5 < OAL/f < 2.0$ [Conditional Expression]

here, OAL represents a distance from an object-side surface of the first lens to an imaging plane, and f represents a focal length of the entire optical system.

5. The high resolution optical system according to claim 1, wherein the optical system satisfies the following Conditional Expression with respect to conditions of chromatic aberration:

$V2 < 30$ [Conditional Expression]

here, V2 represents an Abbe number of the second lens.

6. The high resolution optical system according to claim 1, wherein the first to sixth lenses are formed of plastic lenses.

7. The high resolution optical system according to claim 6, wherein at least one or both surfaces of the first to sixth lenses are formed as aspherical surfaces.

8. The high resolution optical system according to claim 1, further comprising: an optical filter consisting of a cover glass coated with an infrared cut filter for blocking excessive infrared rays included in light introduced from the outside between the six lens and an image surface.

9. The high resolution optical system according to claim 1, further comprising an optical filter is provided between the sixth lens and the image surface side, the optical filter comprising an infrared filter for blocking excessive infrared rays included in light passing through the optical system.

10. The high resolution optical system according to claim 9, wherein the sixth lens abuts the optical filter.

11. The high resolution optical system according to claim 9, further comprising a cover glass coated with the infrared filter.

12. The high resolution optical system according to claim 1, further comprising an aperture stop is provided between the first lens and the second lens.

* * * * *